United States Patent [19]

Weisbart

[11] 4,188,618
[45] Feb. 12, 1980

[54] DIGITAL TACHOGRAPH SYSTEM WITH DIGITAL MEMORY SYSTEM

[76] Inventor: Emanuel S. Weisbart, 99-60 63rd Rd., Forest Hills, N.Y. 11374

[21] Appl. No.: 674,851

[22] Filed: Apr. 8, 1976

Related U.S. Application Data

[63] Continuation-in-part of Ser. No. 449,708, Mar. 11, 1974, Pat. No. 3,950,700, which is a continuation-in-part of Ser. No. 157,964, Jun. 29, 1971, Pat. No. 3,835,382.

[51] Int. Cl.² .......................................... G08G 17/00
[52] U.S. Cl. .................. 340/201 R; 340/52 F; 340/152 T; 340/177 R; 340/189 R; 346/33 D; 364/424; 364/442
[58] Field of Search .............. 340/152 T, 152 R, 23, 340/177 R, 180, 188 R, 189 R, 201 R, 52 F, 24, 263, 183, 669, 670; 73/117.3; 324/166; 235/150.2, 150.21; 364/424, 442; 246/107; 346/34 D

[56] References Cited

U.S. PATENT DOCUMENTS

| | | | |
|---|---|---|---|
| 3,281,779 | 10/1966 | Yeiser | 340/152 R |
| 3,361,897 | 1/1968 | Rush | 235/150.21 |
| 3,376,509 | 4/1968 | Willcox | 325/57 |
| 3,377,616 | 4/1968 | Auer | 340/152 R |
| 3,577,120 | 5/1971 | Sherbert | 340/24 |
| 3,612,837 | 10/1971 | Branday | 235/150.21 |
| 3,644,883 | 2/1972 | Borman et al. | 340/23 |
| 3,665,439 | 5/1972 | Brummer | 340/183 |
| 3,793,882 | 2/1974 | Holben | 364/442 |
| 3,906,437 | 9/1975 | Brandwein et al. | 340/183 |
| 3,908,451 | 9/1975 | Walker | 364/442 |
| 4,050,295 | 9/1977 | Harvey | 364/442 |
| 4,067,061 | 1/1978 | Juhasz | 340/52 F |
| 4,072,850 | 2/1978 | McGlynn | 340/52 F |

OTHER PUBLICATIONS

"Precision Recording Instruments", Argo Instruments Corp.
"The Next Best Thing to BeingThere", Argo Instruments Corp.
"General Instructions for Evaluating Tachograph Charts," Argo Instruments Corp.
"Argo Tachograph," Argo Instruments Corp.
"Accident," Argo Instruments Corp.

Primary Examiner—John W. Caldwell, Sr.
Assistant Examiner—James J. Groody
Attorney, Agent, or Firm—Bernard Malina

[57] ABSTRACT

A digital tachograph system includes a vehicle unit operative to detect vehicle performance characteristics such as vehicle speed, elapsed trip distance, engine rpm, total engine revolutions, total fuel consumption, rate of fuel consumption and the like as a function of time. The forgoing vehicle performance characteristic data is displayed in the vehicle unit and is stored in a data memory located therein. A fixed base unit includes a central computer system for processing vehicle performance data, storing the data in a memory file and for reading out the vehicle performance data in the form of a printout, graph plot, CRT display or the like. The vehicle performance data may be transferred from the vehicle unit to a field terminal which connects to the central computer system either by means of a cable connection by directly interconnecting said portable memory unit or by radio transmission means.

36 Claims, 3 Drawing Figures

DIGITAL TACHOGRAPH SYSTEM WITH DIGITAL MEMORY SYSTEM

BACKGROUND OF THE INVENTION

This application is a continuation-in-part of my copending application Ser. No. 449,708 filed Mar. 11, 1974 which issued as U.S. Pat. No. 3,950,700 which in turn is a continuation-in-part of my then copending application Ser. No. 157,964, filed June 29, 1971 which issued as U.S. Pat. No. 3,835,382.

The present invention relates to vehicle performance and control systems and more particularly to a digital tachograph system.

In my U.S. Pat. No. 3,835,382 there is described an electronic multi-mode vehicle performance indicator system for providing a digital display of odometer, tachometer and speedometer readings. In my copending application Ser. No. 449,708, filed Mar. 11, 1974 (U.S. Pat. No 3,950,700), the system of U.S. Pat. No. 3,835,382 is further provided with means digitally displaying the preselected maximum vehicle velocity or engine rpm. Neither of the systems disclosed in U.S. Pat. No. 3,835,382 or U.S. Pat. No. 3,950,700, however, is provided with means for recording the vehicle performance data which is being generated during the course of operation of the vehicle.

Presently known tachograph systems for recording vehicle performance graphically record the performance data by means of a scribe on paper having a pressure sensitive thin plastic coating. Such paper charts are susceptible to marking or defacement by abrasion and dirt by repeated handling thereof. Such marks, although they consist of fine scratches may obscure or make it very difficult to read whole sections of recorded data. Furthermore, inherent variations in the chart dimensions due to temperature, humidity, atmospheric pressure and manufacturing defects cause distortions in the recorded graphic data which may seriously compromise the accuracy and/or interpretation of such recorded data.

Furthermore, since the stylus in such conventional tachographs receives its modulation pressure via mechanical coupling devices, the resulting record suffers a further deterioration in fidelity.

The conventional method of converting such recorded chart data into digital form is by visual reading thereof with the aid of a microscope or the like. This method is obviously time consuming, costly and subject to substantial human error. Thus, data collected during a very short time period requires a very high measure of resolution such as in the case of the time period just preceding an accident.

Semiautomatic optoelectronic pattern recognition systems have to a very limited extent overcome some of the above-mentioned deficiencies. However, they still require the manual handling of charts and the presence of an operator to feed such charts into the analysis system. Additionally, the inaccuracies in graphic form appear in the printed report. Additionally such analysis apparatus is sensitive to chart dimension variations, marring and scratches. These variations, marring and scratches frequently cause the semiautomatic apparatus to introduce gross errors of its own making.

Additionally, the resolution of such optoelectronic analysis apparatus is too coarse to provide an accident analysis, and accordingly, the microscopic technique must still be used to obtain high resolution data. Frequently, an effort is made to erase scratches and mars on the charts, thus, requiring further human operator attention. In such conventional systems data such as gas consumption must be visually collected from manually recorded data such as gaspump readings and manually typed into the semiautomatic optoelectronic analysis apparatus via its interconnected keyboard, in addition to vehicle identification.

The tachograph data processing system of the present invention overcomes the deficiencies of known tachographs and methods of converting their graphic data into reports having numerical data. The present invention which incorporates the tachograph display of my U.S. Pat. No. 3,835,382 includes an automatic method of transferring data from the tachograph to a central terminal computer system via radio transmission. Since the data exists in digital form in said tachograph, no conversion to digital format is necessary. The fuel consumption is measured by vehicle sensors connected to the tachograph thus overcoming the need for manual transfer of such fuel data into the computer system in addition to avoiding the need for conventional plastic coated paper charts. Furthermore, vehicle identification may be encoded in the tachograph system of the present invention thus making identification by manual typing necessary. The resolution and accuracy of data collected in the tachograph of the present invention is such that accident reports may be easily prepared. Furthermore, a graph plotter connected to the central computer automatically creates a magnified graphic representation of the vehicle speed just prior to an accident without the use of microscopes. In addition, a digital report printout and displays are available via peripherals connected to the central computer.

SUMMARY OF THE INVENTION

In accordance with the principles of the present invention, there is provided a digital tachograph system comprising vehicle detection means operative to detect vehicle performance characteristics and to produce vehicle characteristic data signals corresponding to said detected characteristics and vehicle data memory means operative to receive and store said vehicle characteristic data. There is further provided field computer terminal means and data transmission means operative to selectively transmit the vehicle characteristic data from said vehicle data memory means to said field computer terminal means. The field computer terminal means is operative upon receipt thereof to selectively read out said vehicle characteristic data.

Further objects, features and advantages of this invention will become apparent from a consideration of the following description, the appended claims and the accompanying drawings in which:

DETAILED DESCRIPTION OF THE INVENTION

Figure 1:
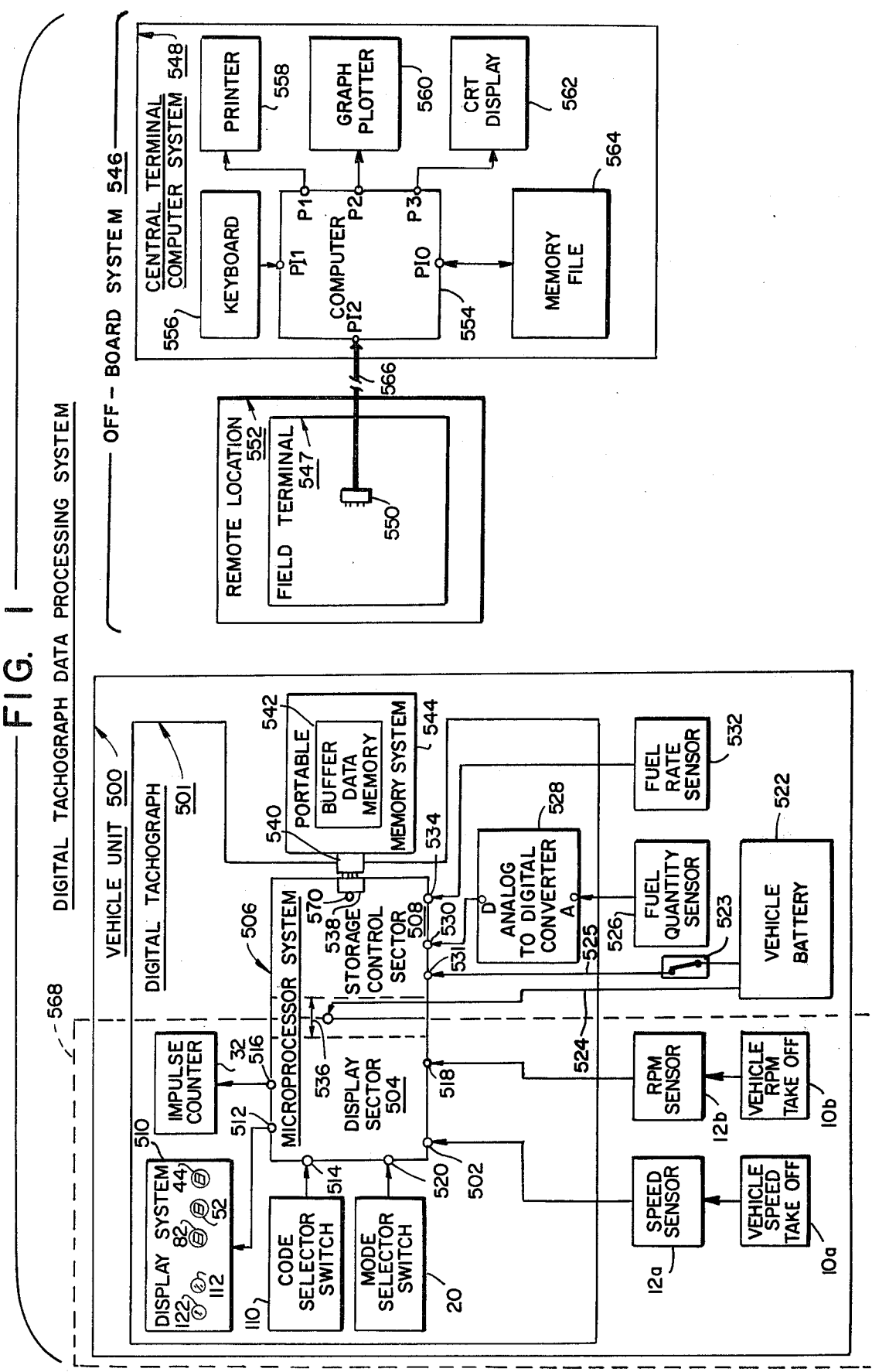
FIG. 1 is a functional block diagram of the present invention in one embodiment thereof.

In my U.S. Pat. No. 3,835,382 there is described an electronic multi-mode vehicle performance indicator system for providing a digital display of odometer, tachometer and speedometer readings. In my U.S. Pat. No. 3,950,700, the system of U.S. Pat. No. 3,835,382 is further provided with means digitally displaying the preselected maximum vehicle velocity or engine rpm. Neither of the systems disclosed in U.S. Pat. No. 3,835,382 or my, is provided with means for recording the vehicle performance data which is being generated during the course of operation of the vehicle. Thus, although not necessarily limited thereto, the tachograph system of the present invention is particularly suitable for incorporation into the vehicle performance indicator system disclosed in U.S. Pat. No. 3,950,700. Accordingly, the structure and principles of operation of the tachograph system of the present invention will be described in conjunction with the vehicle performance indicator system of my U.S. Pat. No. 3,950,700. For reasons of clarity, the elements shown in the drawings which are common to the system shown and described in U.S. Pat. No. 3,950,700 carry the same identifying numerals in the present application as they do in said U.S. Pat. No. 3,950,700.

Furthermore, the specification and drawings of my U.S. Pat. No. 3,950,700 are hereby incorporated by reference into the present application in order to facilitate a complete and clear understanding of the present invention.

Referring to FIG. 1, the portion of the tachograph system of the present invention which is located in the vehicle, is referred to as vehicle tachograph unit 500. Vehicle speed takeoff 10a which may, for example comprise an electromagnetic generator, is mechanically linked to speed sensor 12a which produces an electric signal which represents the vehicle speed. This vehicle speed is applied to input port 502 of the display sector 504 of microprocessor 506.

Generally speaking, microprocessor 506 is operative to receive signals from sensors and controls and to process said signals to suitably drive display devices which indicate vehicle operation parameters. The display signal processing functions are carried out in the display sector 504 of microprocessor 506, while temporary data storage control functions are carried out in storage control sector 508. In the following description, the operation of storage control sector 508 will follow that of display sector 504.

As described in my U.S. Pat. No. 3,905,700, the display system 510, in response to the processed vehicle speed signals at output port 512, displays the vehicle speed in numeric form through numeric display devices 44, 52 and 82. Whenever the preselected excess speed limit set by code selector switch 110 is exceeded by the vehicle, indicator 112 is turned ON.

Code selector switch 110 is connected to input port 514 of display sector 504. Insufficient speed indicator 122 is turned ON whenever the vehicle speed falls below a preselected lower limit which is programmed into display sector 504. The pulses produced at output port 516, representing the mileage travelled by the vehicle, are applied to impulse counter 32 with the stored count being displayed in this odometer configuration in impulse counter 32.

The engine rpm takeoff 10b is mechanically connected to rpm sensor 12b which, like sensor 10b may comprise an electromagnetic generator which produces an output signal representing the instantaneous vehicle speed. The vehicle points may serve as the vehicle takeoff 10b. The rpm signal produced by sensor 10b which is entered into display sector 504 at input port 518 is then processed and may be selectively applied, by mode selector switch 20 to display system 510 and input counter 32 via output ports 512 and 516 respectively.

Mode selector switch 20 is operative to select either the vehicle speed and total vehicle miles traversed mode or engine rpm and total engine revolutions mode. Thus, display system 510 and impulse counter 32 commonly display either vehicle speed-totalized miles or engine rpm—total engine revolutions. The vehicle battery 522 supplies power to microprocessor system 506 via lead 524 and ignition switch 523 through lead 525. In the event that rpm and speed display is desired simultaneously, an additional display system 510 and impulse counter 32 may be added to microprocessor 506.

Vehicle idle status can be determined by utilizing data jointly from vehicle speed takeoff 10a and vehicle rpm takeoff 10b. In the event that an rpm takeoff is not available, the vehicle ignition switch 523 is connected to microprocessor system 506 via lead 525 at input port 531. Thus, the state of ignition switch 523 in conjunction with zero vehicle speed indicates an engine idling condition.

Fuel quantity sensor 526 is operative to provide a signal representing the remaining quantity of fuel in the vehicle fuel tank. Sensor 526, if the analog type, comprises a potentiometer, and the analog output signal is applied to analog-to-digital converter 528 at input A. The resulting digital signal at output D is applied to microprocessor 506 at its input port 530. An alternate fuel rate of flow sensor 532 produces a digital output signal which is applied to microprocessor 506 at its input port 532. If sensors 526 and 532 are digital then their outputs may be applied directly to input ports 530 and 534 respectively, but if analog, their outputs are applied to converter 528 and the resulting digital output from converter 528 are then applied to input ports 530 and 532. The data signals applied to ports 530 and 534 relating to rates of fuel consumption and totalized fuel consumption comprise information which is of particular importance to operators of truck fleets.

Information relating to remaining fuel quantity, rate of fuel consumption, or total fuel consumed may optionally be displayed by feeding such data from storage control sector 508 to display sector 504. As indicated by bidirectional arrow 536, there may be a bidirectional transfer of data within microprocessor system 506 and such information may be fed via port 512 for display in display system 510, and via port 516 to impulse counter 32. Vehicle speed and engine rpm data may be fed from display section 504 to storage control section 508 where such data may be processed with the fuel data as explained in greater detail below.

The combined data in storage control sector 508 is transferred via port 570 to connector 538 and mating connector 540 to buffer data memory 542 including connector 540 comprise a detachable portable memory system 544.

The off-board system 546 comprises a field terminal 547 which may be located at a field station and which may typically include a plurality of commonly connected line terminals and a central terminal computer system 548. Field terminal 547 includes a plug connector 550 which may be located at a location remote from or at the central terminal computer system 548.

Central terminal computer system 548 comprises a computer 554 connected as follows. Keyboard 556 has its output connected to port PI1 of computer 554;

printer 558 has its input connected to computer output port P1; graph plotter 560 has its input connected to computer output port P2; CRT display 562 has its input connected to computer output port P3; memory file 564 has its input-output port connected to PIO; and lead 566 interconnects connector plug 550 with computer input port PI2.

In operation, when a vehicle arrives at remote location station 552, i.e. at a vehicle stop station or at the end of a trip, the vehicle operator detaches portable memory system 544 at connector 538 and connects it to field terminal 547 at connector 550. Now portable memory system 544 contains stored data in buffer memory 542, the memory 542 may typically comprise a non-volatile electrically erasable memory such as an MNOS (metal nitride oxide semiconductor) type memory. When plug 540 is mated with connector 550 the stored data accumulated during the vehicle trip in portable memory system 544 is fed through conductor 566 into computer 554 at input port PI2. Computer 554 thus processes the incoming data in accordance with the programming instructions selected by the fleet managment to provide output reports at the periphal equipment, namely, printer 558, graph plotter 560 and CRT display 562. Furthermore, memory file 564 is operative to store selected large quantities of data from computer 544 and to provide previously stored data to computer 554 upon command. Input keyboard 556 enables manually typed data to be fed into computer 544 in conjunction with data fed from connector 550 and memory file 564.

In one embodiment of the present invention as shown in FIG. 1, display sector 504 may comprise random logic integrated circuitry as disclosed in my U.S. Pat. No. 3,835,382 and my U.S. Pat. No. 3,950,700. Thus, outline 568 indicates those elements which are common to the systems shown and described in my said patent and copending patent application and such elements, therefore, bear the same identifying numerals.

In another embodiment of the present invention, display sector 504 may comprise an "off-the shelf" microprocessor system such as Motorola type M6800 or RCA COSMAC type. Such microprocessors may be programmed with the capability of converting random logic designs into microcomputer language operative to perform such random logic design functions with said microprocessors. In practice, the random logic elements and related data flow as shown in my said copending application may be converted into a computer program operative to effect operations described hereinabove with respect to display sector 504. Similarly, storage control sector 508 may be arranged by utilizing random logic elements or microprocessor techniques, with display sector 504 and storage control sector 508 comprising a single microprocessor system.

Figure 2:
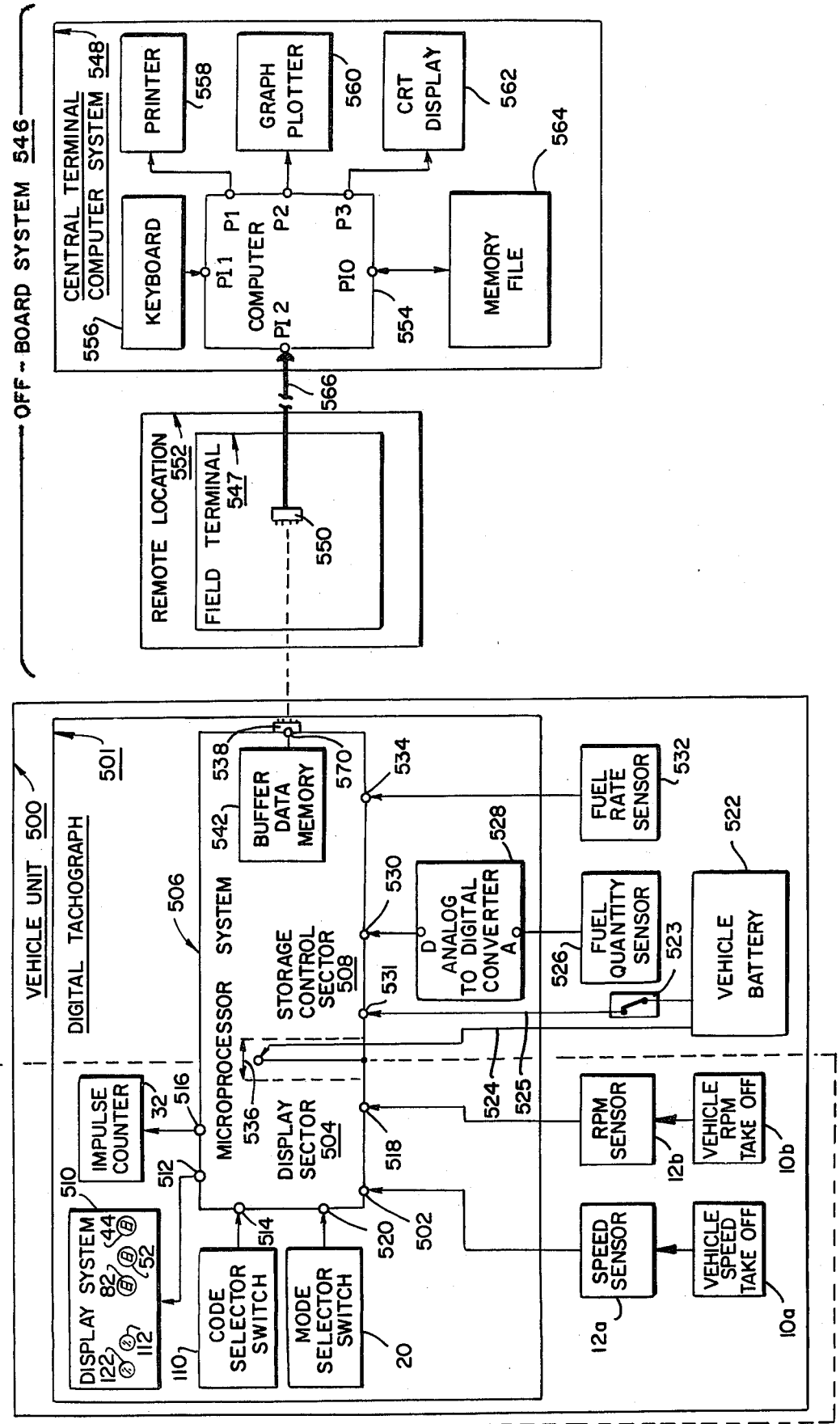
FIG. 2 is a functional block diagram of the present invention in a second embodiment thereof.

In another embodiment of the present invention shown in FIG. 2, the buffer data memory 542 is integral with microprocessor system 506 and is not removable from the vehicle unit 500. Data transfer from buffer data memory 542 to field terminal 547 is effected by a fixed connector 538 which is connected to port 570 and interconnects multiconductor 566 and buffer data memory 542. In operation, when the vehicle arrives at remote location 552, an operator mates connector 538 with connector 550, whereby the elapsed trip data flows from buffer data memory 542 through port 570, connector 538, multiconductor 567, connector 550 and multiconductor 566 into computor 554 at input port PI2 where such data is processed as described hereinabove with respect to FIG. 1. After several moments, the vehicle operator may remove connector 550 from connector 538 as the data transfer has been completed.

Figure 3:
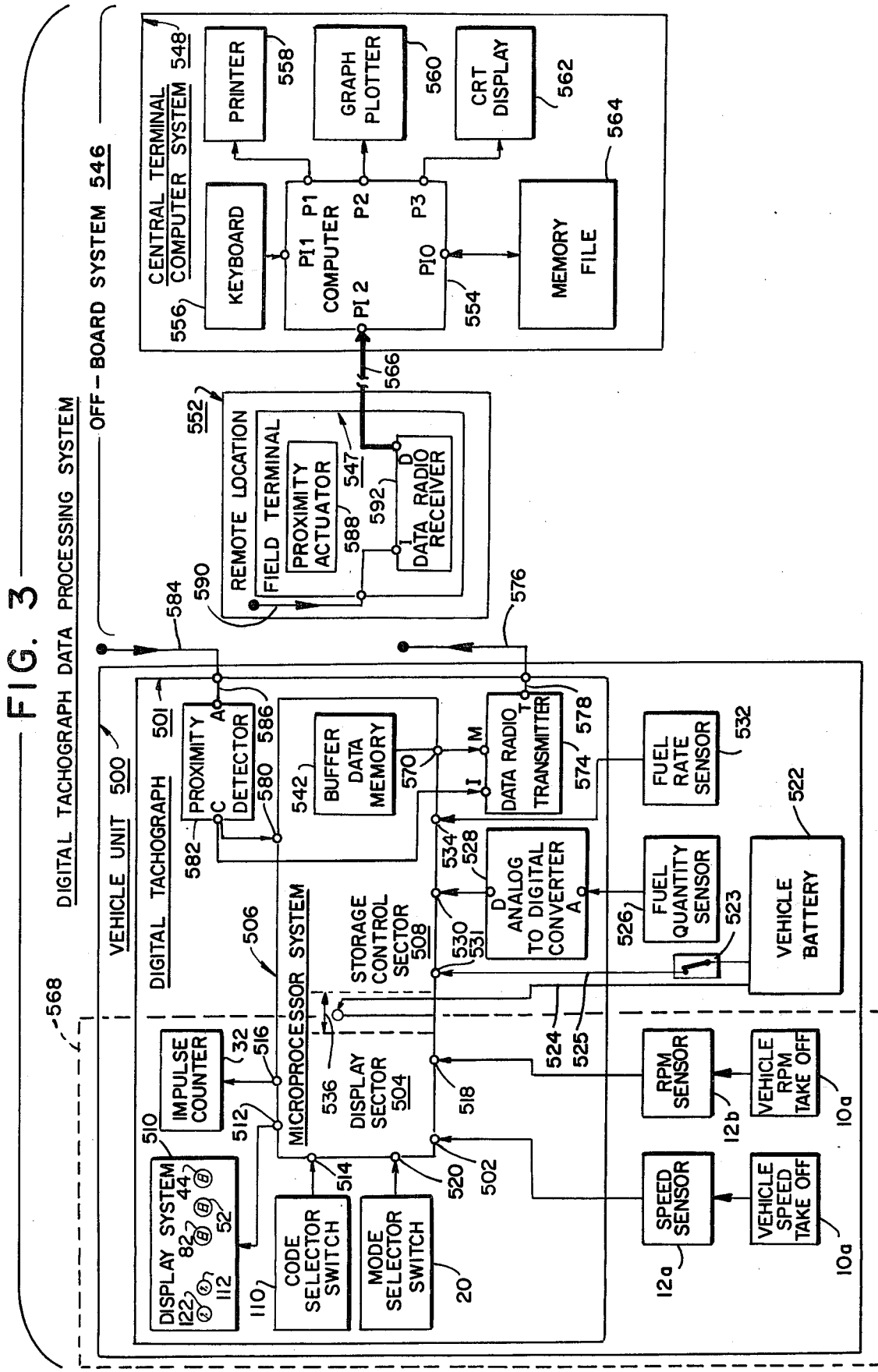
FIG. 3 is a functional block diagram of the present invention in a third embodiment thereof.

In further embodiment of the present invention shown in FIG. 3, data transfer from buffer data memory 542 to field terminal 547 is accomplished by radio transmission. As shown in FIG. 3, the output of buffer data memory 542 which is integral with microprocessor system 506 is connected to microprocessor port 570 which is connected to the modulator input M of radio transmitter 574 which is connected to digital tachograph 501 in the vehicle. The output T of transmitter 574 is connected to a transmitting antenna 576 via cable 578. Transmitting antenna 576 may be suitably mounted on the vehicle.

Input port 580 of microprocessor 506 is connected to output C of proximity detector 582 which may typically comprise either a limit switch, photocell or radio receiver or the like. Proximity detector output C is also connected to control input I of data transmitter 574, while receiving antenna input A of proximity detector 582 is connected to receiving antenna 584 via transmission line 586 in the case where proximity detector 582 comprises a radio receiver. Receiving antenna 584 may, alternately, comprise a trip lever connected to proximity detector 582 should the latter be a limit switch, or a lens system (not shown) if detector 582 is a photocell.

Proximity actuator 588, which is located at field terminal 547, may typically comprise either a radio transmitter, a directional encoded light source or a trip mechanism designed to trip proximity detector 582 (should detector 582 be a limit switch) via antenna 584. Antenna 590 is connected to input I of data radio receiver 592, which is mounted at location 552 while output D of receiver 592 is connected to input port PI2 of computer 554.

In operation, when the vehicle arrives at location 552, proximity actuator 588 trips proximity detector 582 via radio transmission of limited range, (or directional light signal, or mechanical pressure, etc.) via antenna 584 through transmission line 586. Proximity detector 582 through its output C and input port 580 of microprocessor 506 initiates "a read data" subroutine which causes the stored data to appear at port 570 and flow to modulator input M of data radio transmitter 574. Furthermore, the signal at output C of proximity detector 582 appearing at input I of transmitter 574 causes it to transmit data appearing at the input M thereof. The transmitted data in the form of radio signals is received at antenna 590 and flow to input I of data radio receiver 592 where it is detected and amplified. This data at output D of data radio receiver 592 in the form of an amplified pulse train now enters computer 554 at its input port PI2 via cable 566 and the data is processed as described hereinabove with respect to FIG. 1.

Although the invention has been described with reference to particular embodiments thereof it is to be understood that such embodiments are merely illustrative of the application of the principles of the invention. Numerous modifications may be made therein and other arrangements may be devised without departing from the spirit and scope of the invention.

What is claimed is:

1. A digital tachograph system for recording performance of a vehicle comprising detection means adapted for location entirely on-board said vehicle and operative to continuously detect the dynamic vehicle performance characteristics thereof including vehicular velocity thereof as a function of time and to produce a continuous stream of vehicle characteristic versus time data signals corresponding to said detected characteristics; digital display means operative to selectively display the instantaneous value of said vehicle performance characteristics; data memory means adapted for location on-board said vehicle and operative to continuously receive and record said vehicle characteristic data signals representing said vehicle characteristic data; fixed base computer terminal means including central terminal computer means, and data transmission means operative to selectively transmit said vehicle characteristic data from said vehicle data memory means to said central terminal computer means; said central terminal computer means being operative upon receipt thereof via said data transmission means to selectively read out said vehicle characteristic data.

2. A digital tachograph system as defined in claim 1 wherein said vehicle data memory means is solid state.

3. A digital tachograph system as defined in claim 2 wherein said central terminal computer means includes recording means for providing a visual record of said vehicle characteristic data.

4. A digital tachograph system as defined in claim 3 wherein said recording means includes printer means for providing a documentary readout of said vehicle characteristic data.

5. A digital tachograph system as defined in claim 3 wherein said recording means includes graph plotter means for providing a documentary analog readout of said vehicle characteristic data.

6. A digital tachograph system as defined in claim 3 wherein said recording means includes cathode ray tube display means.

7. A digital tachograph system as defined in claim 3 wherein said central terminal computer means includes memory file means for storing said vehicle characteristic data.

8. A digital tachograph system as defined in claim 3 wherein said vehicle data memory means is adaptable for detachable mounting in said vehicle.

9. A digital tachograph system as defined in claim 3 wherein said data transmission means comprises field terminal means operative to electrically interconnect said vehicle data memory means to said fixed base computer terminal means.

10. A digital tachograph system as defined in claim 9 wherein said data transmission means includes data radio transmitter means adaptable to be mounted in said vehicle and said field terminal means includes data radio receiver means.

11. A digital tachograph system as defined in claim 3 wherein said field terminal means comprises an input connector operative to connect the output of said vehicle data memory means to said field terminal means.

12. A digital tachograph system as defined in claim 11 wherein said vehicle data memory means comprises an output connector operative to be selectively connected to said field terminal means input connector.

13. A digital tachograph system as defined in claim 12 wherein said field terminal means comprises cable means operative to selectively interconnect said vehicle data memory means output connector and said field terminal means input connector.

14. A digital tachograph system as defined in claim 10 wherein said data transmission means includes proximity detector means operative to detect the proximity of said vehicle to said field terminal means and in response thereto to produce a proximity signal to cause said data radio transmitter means to transmit the vehicle characteristic data, said field terminal means including proximity activator means for detecting said proximity signal and in response thereto for causing said data radio receiver to receive said vehicle characteristic data when said vehicle is in proximity to said field terminal means.

15. A digital tachograph system as defined in claim 2 including a microprocessor system for processing said vehicle characteristic data and feeding said data to said digital display means and said vehicle data memory means.

16. A digital tachograph system as defined in claim 15 wherein said microprocessor system is operative to convert random logic designs into microcomputer language.

17. A digital tachograph system as defined in claim 2 wherein said vehicle data memory means comprises a non-volatile electrically erasable memory.

18. A digital tachograph system as defined in claim 17 wherein said vehicle data memory means comprises a metal nitride oxide semiconductor memory.

19. A digital tachograph system as defined in claim 7 wherein said central terminal computer means includes a keyboard operative to generate manually typed data.

20. A digital tachograph system as defined in claim 2 wherein said vehicle data memory means comprises semiconductor means.

21. A digital tachograph system as defined in claim 1 including signal processing means for controlling the flow of said vehicle characteristic data signals to said digital display means and said vehicle data memory means.

22. A digital tachograph system as defined in claim 1 wherein said vehicle detection means includes vehicle tank fuel quantity detection means.

23. A digital tachograph system as defined in claim 1 wherein said vehicle detection means includes fuel rate-of-consumption detection means.

24. A digital tachograph system as defined in claim 22 wherein said vehicle characteristic data signals are in analog form.

25. A digital tachograph system as defined in claim 22 wherein said vehicle characteristic data signals are in digital form.

26. A digital tachograph system as defined in claim 23 wherein said fuel rate-of-consumption detection means is operative to produce analog fuel rate-of-consumption signals.

27. A digital tachograph system as defined in claim 23 wherein said fuel rate-of-consumption detection means is operative to produce digital fuel rate-of-consumption signals.

28. A digital tachograph system as defined in claim 21 wherein said signal processing means comprises an analog-to-digital converter.

29. A digital tachograph system as defined in claim 22 wherein said vehicle tank fuel quantity detection means is operative to produce analog fuel quantity signals.

30. A digital tachograph system as defined in claim 22 wherein said vehicle tank fuel quantity detection means is operative to produce digital fuel quantity signals.

31. A digital tachograph system as defined in claim 13 wherein said vehicle data memory means is solid state.

32. A digital tachograph system as defined in claim 31 wherein said vehicle data memory means comprises a nonvolatile electrically erasable memory.

33. A digital tachograph system as defined in claim 32 wherein said vehicle data memory means comprises a metal nitride oxide semiconductor memory.

34. A digital tachograph system as defined in claim 8 wherein said vehicle data memory means is solid state.

35. A digital tachograph system as defined in claim 34 wherein said vehicle data memory means comprises a non-volatile electrically erasable memory.

36. A digital tachograph system as defined in claim 35 wherein said vehicle data memory means comprises a metal nitride oxide semiconductor memory.

* * * * *